S. F. NICOLAI.
MOLDING MACHINE.
APPLICATION FILED APR. 10, 1907.

942,457.

Patented Dec. 7, 1909.
5 SHEETS—SHEET 1.

Witnesses
F. C. Gibson.
H. Allen.

Inventor
Samuel Franklin Nicolai.
By Victor J. Evans
Attorney

S. F. NICOLAI.
MOLDING MACHINE.
APPLICATION FILED APR. 10, 1907.

942,457.

Patented Dec. 7, 1909.
5 SHEETS—SHEET 4.

Fig. 4.

Witnesses
F. C. Gilson.
K. Allen

Inventor
Samuel Franklin Nicolai,
By Victor J. Evans
Attorney

UNITED STATES PATENT OFFICE.

SAMUEL FRANKLIN NICOLAI, OF JACKSON, MICHIGAN.

MOLDING-MACHINE.

942,457.

Specification of Letters Patent.

Patented Dec. 7, 1909.

Application filed April 10, 1907. Serial No. 367,377.

*To all whom it may concern:*

Be it known that I, SAMUEL FRANKLIN NICOLAI, a citizen of the United States, residing at Jackson, in the county of Jackson and State of Michigan, have invented new and useful Improvements in Molding-Machines, of which the following is a specification.

The invention relates generally to an improvement in molding machines, and particularly to an apparatus constructed and arranged for the expeditious molding and handling of artificial blocks or similar articles.

The main object of the present invention is the production of a molding machine in which the respective mold walls are maintained in fixed relative positions during the molding operation and expeditiously and conveniently separated when desired to remove the formed article.

Another object of the invention is the provision of means to permit the independent adjustment of the respective mold walls, whereby the apparatus is adapted for the convenient molding of articles of different sizes.

Another object of the invention is the provision of means for clamping the removable pallet in place, the said means being arranged to accommodate pallets of different thicknesses without affecting the efficiency of the apparatus.

Another object of the invention is the provision of means to provide for the independent adjustments of the respective mold walls, whereby the operator may conveniently adjust any particular dimension of the mold without disturbing the other parts.

With the above objects in view, the invention consists in certain details of construction and combinations of parts which will be clearly described in the following specification, reference being had therein particularly to the accompanying drawings, in which:—

Referring particularly to the drawings, wherein is illustrated the preferred embodiment of details of my invention, the improved molding apparatus comprises a base frame including spaced parallel walls 1 and 2 of identical construction. Each wall is formed to provide a rear or mold supporting portion 3 and a relatively forward or mold rest portion 4, the upper edge of the latter being cut away in rounded form to permit operation of the parts as will presently appear.

The rear ends of the respective walls are connected by a cross plate 5 being preferably reinforced at this point by brace strips 6. The forward ends of the walls are connected by curved brace strips 7, with their central portions connected and their terminal ends arranged in spaced relation. The extreme forward ends of the respective walls are preferably in the form of posts 8 to which are slidably connected mold rests 9, preferably in the form of metallic strips longitudinally slotted at 10 to engage a set screw 11 secured in the posts, the upper ends of the strips being laterally projected to provide mold-supporting lips 12.

The mold proper is made up of a pallet 13, a face plate 14, a mold wall 15, and end walls 16, all of which parts may be constructed of any desired material and shape. The mold wall 15 is carried by the base frame, being adjustably connected therewith to provide for desired elevation or lowering of the wall with respect to the frame, or any tilting adjustment of the wall to insure proper mold-forming position of said wall. To provide for these respective adjustments the mold wall is formed with guiding plates 17, arranged adjacent the respective ends of the wall and extending at right angles from the rear surface thereof. The rear portion of each side wall of the base frame is provided with a bracket plate 18 formed with a plurality of longitudinally arranged slots 19 to receive set screws 20 projecting from the respective guiding plates 17. The bracket plates are secured at their lower ends to the outer sides of the respective walls 1 and 2, through the medium of set screws 21 entering transversely arranged slots 22 in the lower portions of the bracket plates. In alinement with the upper edges of the frame bars 1 and 2 the bracket plates 18 are provided with laterally projecting lips 23, designed to rest upon the head of a set screw 24 threaded in an opening formed in the frame walls, said walls being cut away at 25 to provide convenient access to the screw, the upper edges of the walls in advance of the cutaway portion being inclined to provide for proper adjustment at this point.

A shaft 26 is revolubly supported in the frame walls, or in bearings secured upon the upper ends thereof, said shaft being provided adjacent each end with gear pinions 27. The mold wall 15 is formed on the rear surface with rack bars 28 to be engaged by the respective pinions 27, whereby in the revolution of the shaft 26 said wall may be raised or lowered as desired. As a convenient operating means for the shaft I secure about centrally of said shaft a tooth pinion 29 and loosely mount upon the shaft adjacent said pinion a handle 30. The opposing edges of the handle are provided with reversely arranged pawls 31 and 32 adapted for engagement with the pinion 29, said pawls being of any desired type to provide for rotating the pinion in the movement of the handle. The pawls are reversely disposed to permit one or the other to be thrown into operative relation to the pawl and rotate the shaft 26 in the desired direction in the movement of the handle.

The pallet, face plate, and end walls of the mold are supported upon an independently movable frame, hereinafter termed the mold frame. This frame comprises spaced parallel side bars 33 and 34, connected by end bars 35 and an intermediate bar 36. In normal position the frame extends in vertical relation to the base frame, the side bar 33 forming the upper bar of the frame and the side bar 34 the lower bar thereof. The end and intermediate bars 35 and 36 are extended beyond the upper side bar 33 for a short distance, as at 37, the terminals of which extensions are connected by a handle bar 38 to provide a convenient operating means for the frame and mold carried thereby.

Figures 6, 7, 8:
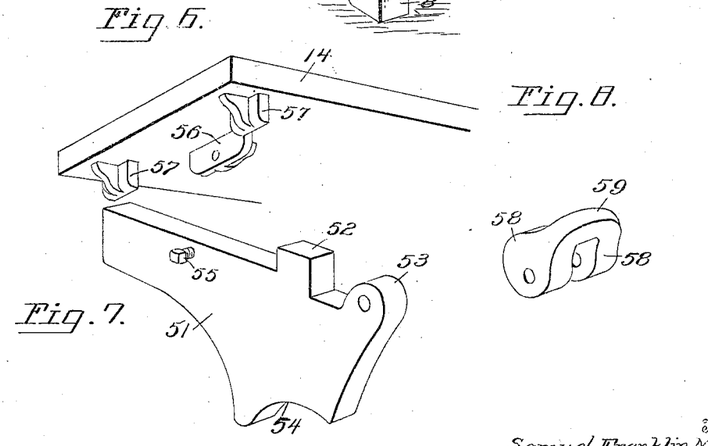
Fig. 6 is a bottom perspective of one end of the face plate of the mold, showing particularly the bracket connections therefor.
Fig. 7 is a perspective view of one of the face plate supporting brackets.
Fig. 8 is a perspective of one of the face plate adjusting eccentrics.
Figures 9, 10:
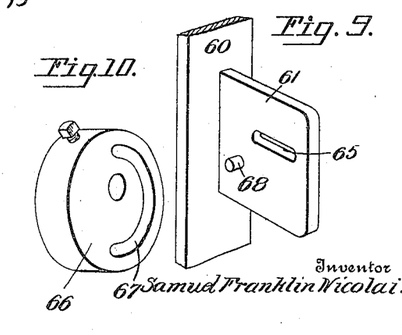
Fig. 9 is a broken perspective illustrating a portion of one of the pallet adjusting strips.
Fig. 10 is a perspective of the cam for coöperating with the pallet adjusting strip.
Figure 11:
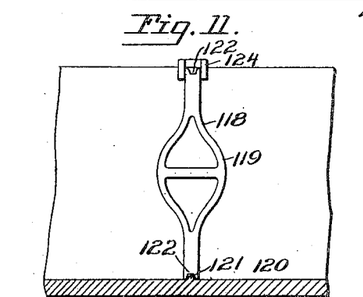
Fig. 11 is a broken sectional view of the mold, illustrating particularly a division plate for use with the mold.

Depending from the lower side bar 34, adjacent each end of said bar is a series of guide plates 39, said plates being arranged in spaced parallel relation and in any desired number. The relatively forward edge of each of the plates is formed in the upper portion with a bearing depression 40, for a purpose which will presently appear. The relatively outermost guide plate 39 of each series is provided with a laterally projecting pin 41 to receive an adjusting block 42, which block is designed to seat in a housing 43 cast or otherwise formed on the outer side of each of the base frame walls. The adjusting block is formed with a longitudinal series of holes 44 to provide for adjustable reception of the pin 41, while the housing 43 is interiorly of greater dimensions than the block and is provided with adjusting screws 45 whereby the block may be adjusted longitudinally or transverse the housing as desired. The relatively rear edge of each of the guide plates 39, near the lower portion, is formed to provide a bearing 46, in which bearings is mounted a shaft 47. Centrally of its length the shaft is provided with a weight lever 48 adjustably fixed on the shaft and carrying an adjustable weight 49 at its free end, and intermediate the adjacent guide plates of each series the shaft 47 is provided with an eccentric disk 50. The face plate 14 of the mold is supported upon brackets 51, illustrated more particularly in Fig. 7. The bracket 51 is of approximately bar form for a portion of its length to receive and support the face plate 14, being provided in rear of said portion with a projection 52 approximately corresponding in length to the thickness of the face plate, and in rear of the projection with an ear 53. The relatively lower and rear edge of the bracket is materially extended and formed with a rounded depression 54 to coöperate with the eccentric disks between the guide plate 39. The brackets are secured to the face plate through the medium of a set screw 55 passing through the wall of the bracket and engaging a block 56 on the lower surface of the face plate, said plate being also formed with fixed stop blocks 57 arranged in alinement tranverse the face plate and spaced from the block 56 so as to permit the insertion of the bracket between said blocks. As the screw 55 is operated the bracket will be forced against the blocks 57 and thereby secured to the face plate.

The brackets 51 are, when in operative position arranged between two of the guide plates 39 of each series, the depression 54 of the bracket resting upon the eccentric disk 50 between said plates. In this position the ear 53 projects above the bearing surfaces 40 of the guide plates, and in this position there is pivotally mounted on said ear a pair of cam disks 58 connected by a handle portion 59, as clearly shown in Fig. 8. These disks are eccentrically mounted with relation to the ear 53, and their edges are adapted to bear on the bearing surfaces 40 of the respective plates 39 between which the bracket is disposed. By this arrangement it is obvious that rotation of the disks 58 through the medium of the handle 59 will elevate or depress the connected end of the bracket and thereby similarly affect the face plate 14, thus providing a simple and convenient means for independently adjusting the face plate of the mold.

As a means for adjusting the pallet board with relation to the remaining mold sections, I provide adjacent each of the end bars 35 and the intermediate bar 36 of the mold frame a clamping strip 60. The clamping strips adjacent the respective end bars 35 are provided with forwardly projecting lips 61 designed to slide in appropriately formed grooves 62 in the respective end bars. The strip 60 adjacent the intermediate bar 36 of the mold frame is formed with a similar lip 63, though of somewhat greater length than the lips 61. The strip 60 is of somewhat greater length than the vertical dimension of the mold frame, and is provided adjacent each end with one of the lips 61. Shafts 64 are revolubly mounted in the end bars 35 of the mold frame, said shafts extending longitudinally of the mold frame in parallel relation and through the intermediate bar 36. The respective shafts pass through the alined lips of the clamp strips, said lips being longitudinally slotted, as at 65 to permit the passage of the shafts without interfering with the movement of the lips. Adjustably secured on each of the shafts 64 adjacent each of the respective lips 60 is a cam disk 66 formed in one face with a cam groove 67 arranged to receive a pin 68 projecting from the adjacent lip. Similar cam disks 69 are provided on the respective shafts adjacent the lips 63 of the central clamping strip, these latter disks being provided with pins 70 entering cam shaped slots 71 formed in the relatively forward ends of the adjacent lips. The respective disks 69 are formed with extensions 72 which are connected for simultaneous operation by a link 73, the extension of the lower disk 69 being projected beyond the link in the form of a handle 74. The respective cam disks are adjustably secured upon the shafts through the medium of set screws 75, so that the operator may initially regulate the parts to secure the desired clamping relation of the strips 60 with the pallet. One or the other of the pins 71 projecting from one of the intermediate disks 69 is preferably a set screw, so that the disk may be locked to the lip and further movement of the parts prevented when it is desired to set the clamping strips in a certain position. The end walls 16 of the mold are supported and operated in an identical manner, being provided with a pin 76 projecting from the outer surface thereof and adapted to seat in an opening 77 in the head 78 of an adjusting arm 79. The head 78 of the arm is of materially less dimension than that of the end plate, and in advance of said head the arm is offset at 80 to provide a recessed portion 81, this recessed portion being of appreciable depth and alined with the ends of the pallet to provide for the use of a pallet of extreme length. Beyond the recessed portion the arm 79 is formed with a forward projection 82, for a purpose which will presently appear. Each arm 79 is pivotally supported in an arm frame 93 comprising strips 84 connected at their outer or free terminals by hand gripping and bracing bar 85. The respective strips 84 are designed to slidably engage the adjacent surfaces of bearing bars 86 projecting from the end bar 35 of the mold frame, said strips 84 being preferably provided with side flanges 87 to engage the side walls of the bars 86 to guide the arm frame in movement. The respective strips of the arm frame are provided with alined bosses 88, forming bearings for shafts 89 and 90, it being understood in this connection that a number of such bosses may be provided to permit the adjustment of the shafts 89 and 90 longitudinally of the arm frame with respect to the end bar of the mold frame. The arm 81 is pivotally mounted on the shaft 89, being provided with a spring 91 engaged beneath the projection 82 of the arm, coiled about the shaft 89 above and below the arm and terminally connected to the shaft 90, said spring serving to normally maintain the arm in operative position, or more properly speaking to normally maintain the end wall of the molds in mold-forming position. The end wall of the mold is removably secured to the head of the arm through the medium of a set screw 92 engaging the pin 76 carried by the wall, so that provision is made for the convenient substitution of different size end walls when desired.

The arm frame is adjustably secured to the bars 86 fixed to the mold frame through the medium of set screws 93 carried by the respective guide flanges 87 of the strips 84 and entering elongated slots 94 arranged longitudinally of the bars 86. By the provision of a series of openings in the flanges 87 for the reception of the set screw 93, it is obvious that the arm frame may be adjusted longitudinally of the bars 86, and, therefore, to and from the mold-frame end bars to any desired point, thereby similarly adjusting the end bars or walls 16 of the mold box, or either of them longitudinally of the box to increase or decrease the length of the article to be molded. On each of the end bars 35 of the mold frame are secured bearing blocks 94 in which is mounted a shaft 95. An arm 96 is adjustably secured upon said shaft through the medium of a set screw 97, and said arm 96 is connected with the projection 82 of arm 79 by a flexible cable 98. By preference the cable extends through openings in the free ends of the projection and arm, being secured therein by set screws, whereby the distance of cable between the respective parts may be adjusted as desired.

The projection 82 is formed on the relatively inner or rear surface with an opening in which is operatively mounted a set screw 99, the head of the latter being so arranged as to engage the shaft 90 of the arm frame when the arm 79 is in operative or closed position. The use of this set screw provides a convenient means for adjusting the throw of the arm, and limiting this position as desired.

Figures 5, 13, 14:
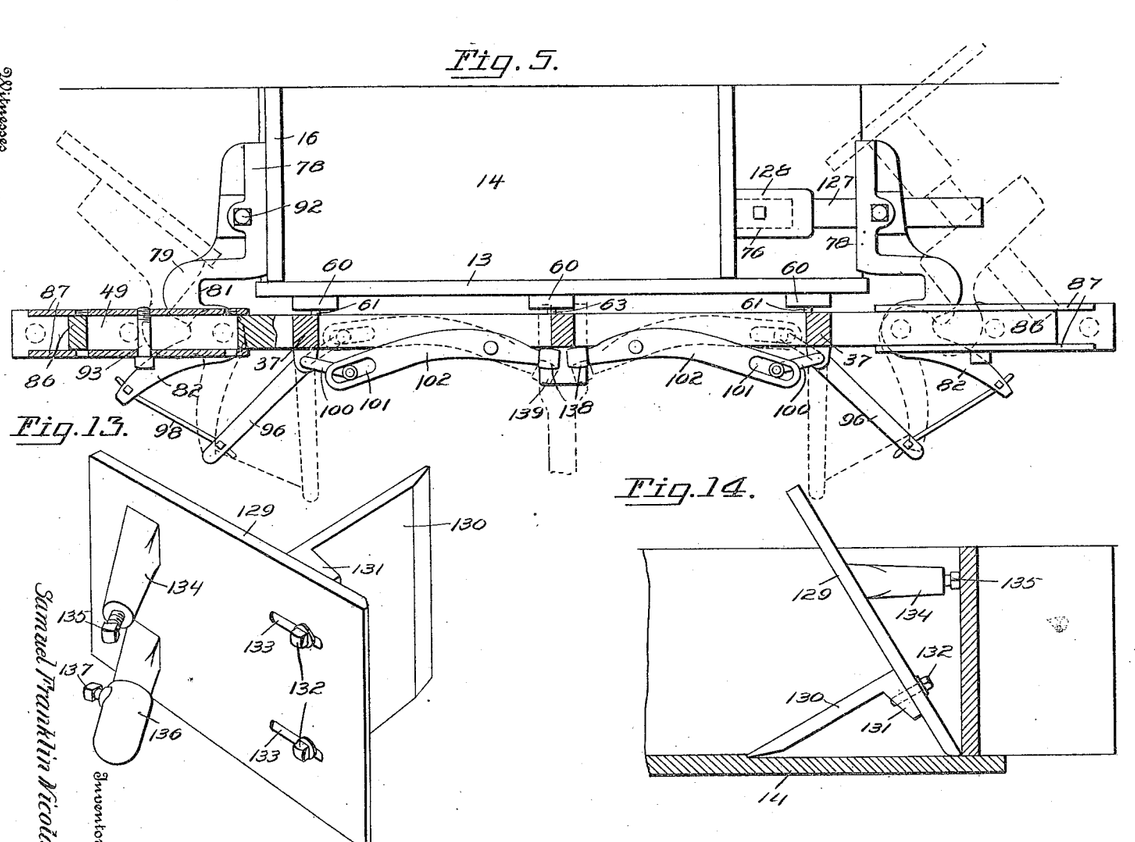
Fig. 5 is a section on line 5—5 of Fig. 3, a portion of the apparatus being shown in diagram.
Fig. 13 is a rear perspective of an adjustable angle former for use with the mold.
Fig. 14 is a vertical section of the mold with the angle former in place, the latter being shown in elevation.

The relatively upper ends of each of the shafts 95 are formed to provide cranks 100, the operative projections of which are loosely seated in slots 101 formed in the relatively outer ends of levers 102 pivotally mounted on the upper side bar 33 of the mold frame. The inner ends of these levers, which are preferably slightly curved in plan, as shown in Fig. 5, terminate in advance of the extension 37 from the intermediate bar 36 of the mold frame.

An operating handle 103 formed with spaced fingers 104 is arranged to operate said levers, said fingers being disposed upon opposite sides of the extension 37 of the intermediate frame bar 35 and pivotally secured thereto, as at 105. The handle 103 is preferably in two sections having hinge connections 106, so that the forward or hand grasping portion 107 may normally depend close to the mold frame when not in use to avoid obstruction. The handle 103 is connected by a cable 108 to the weight lever 48 on the shaft 47, said cable preferably passing through guides 109 on the intermediate bar 35 and being terminally connected to the handle and weight lever by set screws to secure desired adjustment.

Brace supports 110 are adjustably secured on the upper edges of the mold wall 15, said braces having adjustable connection with the wall through the medium of set screws 111 carried by the wall engaging slots 112 carried by the braces, each brace is formed with a lip 113 to overlie the upper edge of the wall and with a forwardly projecting lip 114 to provide a brace for the end wall 16 of the mold when the latter is in mold forming position.

Figure 1:
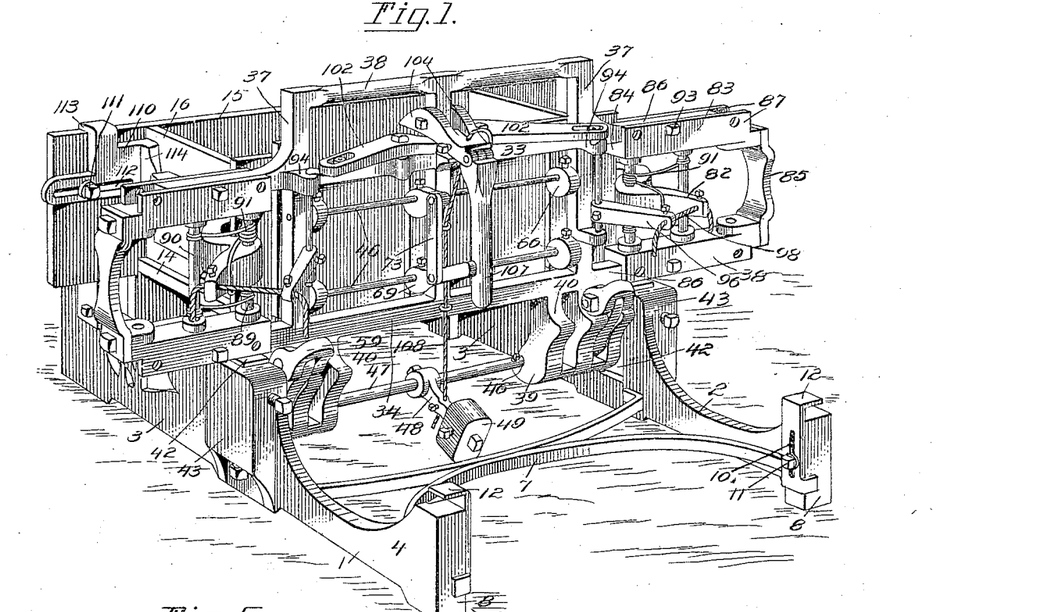
Figure 1 is a perspective view showing a molding machine constructed in accordance with my invention.
Figures 2, 15:
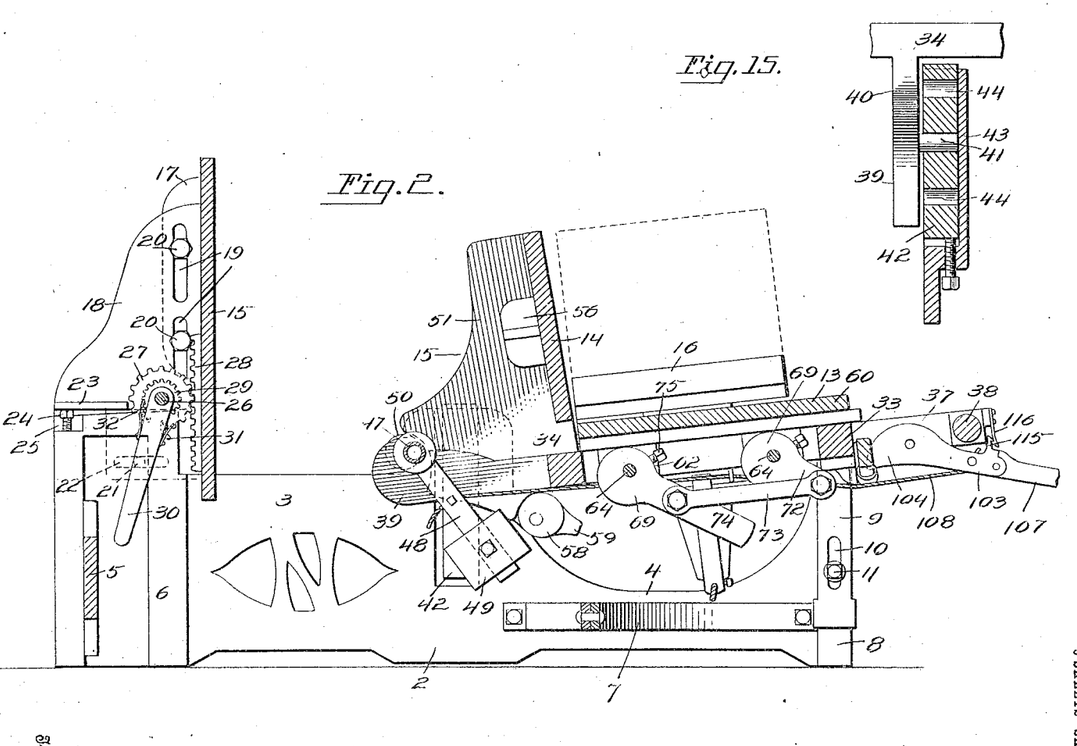
Fig. 2 is a central transverse section of the same, the mold being shown in inoperative position, with the walls thereof open to permit removal of the article.
Fig. 15 is a sectional detail, partly in elevation, showing the means for adjusting the mold frame relative to the base frame.
Figure 3:
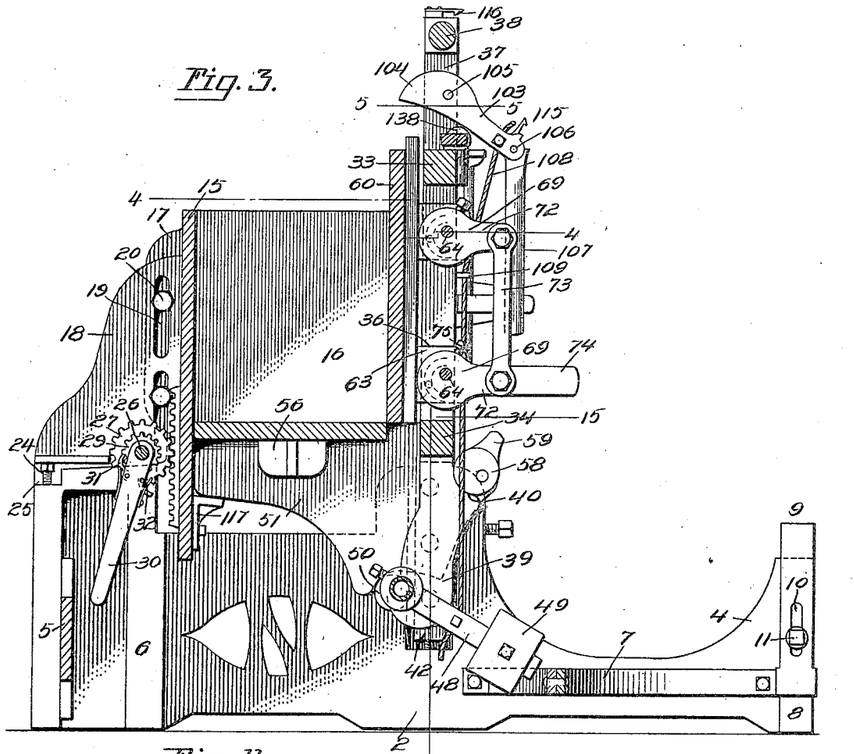
Fig. 3 is a similar section with all parts in operative positions.
Figure 4:
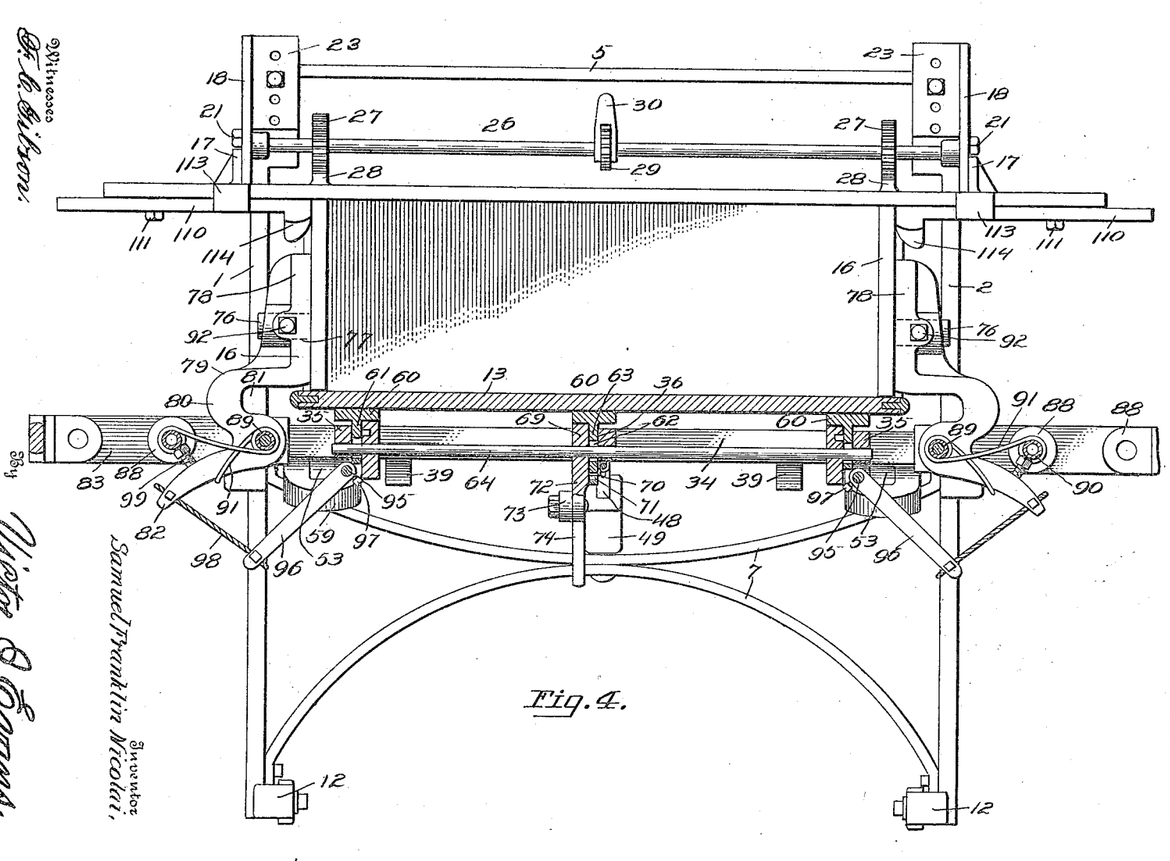
Fig. 4 is a longitudinal section on the line 4—4 of Fig. 3.

With the parts constructed and arranged as described, the operation is as follows: Assuming the parts in the positions illustrated in Fig. 1, which is the operative position, it will be noted that the pallet 13 and wall 15 form the vertical sides of the mold box, while the face plate 14 forms the bottom thereof. The material to form the article is now inserted in the mold box in any usual or preferred manner, with or without the use of a core. After the material has been inserted and tamped and it is desired to remove the article from the mold, the handle bar 38 of the mold frame is grasped and the mold swung down on the pivot pins 41, as bearings. This movement is continued until the relatively upper portion of the mold frame rests upon the lips 12 of the supports. The handle 103 is now elevated, the section 107 being grasped and moved until reaching the limit of its hinge connection whereupon further movement will operate the section 103. The initial movement of the section 103 elevates the weight lever 48, thereby rocking shaft 47 and moving the eccentrics so as to permit the relatively forward ends of the brackets 55 to be lowered by their own weight, thus freeing the face plate, which in this position constitutes the rear plate of the mold, from the molded material.

On the further movement of the handle the ends of the fingers 104 will engage the relatively adjacent ends of the levers 102, with the effect to force the opposite ends of said levers inward. As the outer ends of the levers are connected to the shafts 95, said shafts will be rocked, and through the arms 96 and cables 98 draw upon the projections 82 of the operating arm 79, swinging said arms on their pivotal shafts 89 against the tension of the springs 91. This movement of the arms being effective for swinging the end plates 16 from contact with the molded article, the movement of the projections 82 being permitted by the reduced rounded portion of the side frame bars previously described.

The article is now supported upon the pallet 13, and the respective mold walls are entirely free from contact with the article, permitting the pallet with the supported article to be readily removed from the machine.

If desired the handle section 107 may be formed with a catch 115 to engage a spring arm 116 carried on the handle bar 38 so as to lock the parts in open position when desired.

In returning the molds to operative position, the catch 115 is released, whereupon the springs 91 operate to return the end walls 16 to normal position and the weight 49 serves to rock the shaft 47 and by the eccentric disks 50 force the brackets 51 and thereby the face plates 14 into engagement with the proximate edges of the end walls 16. As a further means for maintaining normal position of the face plate I prefer to provide the mold wall 15 below the normal plane of the brackets 51 with stop blocks 117, which, as the mold is moved into closing position, are engaged by the brackets with the result of forcing the face plate to its proper plane.

The apparatus of the present invention is particularly designed for the independent adjustments of the respective mold sections. For example through the bracket plates 18 and set screw 25 the mold wall 15 may be adjusted as desired with respect to its inclination, while through the racks 28 and pinions 27 the mold wall 15 may be adjusted as desired with respect to its elevation. The face plate 14 may be adjusted with respect to the mold box through the medium of the disks 58, it being obvious that in the operation of these disks the relatively forward ends of the brackets 51, and, therefore, the supported face plate may be elevated or depressed. The adjustment of the clamping strips 60 provides for securing the pallet in desired relation to the other mold forming section, the movement permitted these strips in the operation of the cam adapting the machine without change to pallets of varying thicknesses. This is an important feature in an invention of this character, as in the use of heavier or lighter pallets instant accommodation for their proper clamping in mold box forming position is provided for.

The end walls may be readily removed from the operating arm and smaller or larger walls substituted, while by the use of the set screws 45 the pivot blocks 42 may be elevated or adjusted toward or from the mold wall 15 for truing the movable sections of the mold box or for increasing or decreasing the width of the article. As previously stated the pivot blocks 42 are formed with a series of holes 44 to receive the pivot pin of the mold frame. It is obvious that by the use of these molds, which may be arranged in any desired form or relative spacing, the mold frame, and, therefore, the movable sections of the mold box may be elevated or depressed as desired, this elevation and depression being also accommodated in a more accurate degree by the vertical adjusting screw in the pivot block housing. The elevation or depression of the mold box as an entirety, together with the rack bar and operating means carried by the mold wall, wherein provision is made for the vertical adjustment of the latter, provides a convenient and readily operable means whereby the width of the completed article may be adjusted as desired.

The recessed portions 81 of the operating arm, which, as previously stated are alined with the end of the pallet, permits the use of an extended pallet in length, so that one length pallet is readily adapted for service in molding articles of different lengths. As the arrangement of the pallet clamping means heretofore described afford absolutely no restriction to the width of the pallet in the direction from the mold wall 15, it is, of course, apparent that the apparatus as ordinarily constructed is adapted for the use of a pallet of any width. By this disposition of the parts a pallet of one size may, by the adjustments described before the other mold box sections, be conveniently adapted for the formation of articles of varying lengths and widths.

Figure 12:
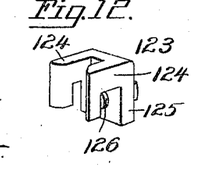
Fig. 12 is a perspective of the clamp for use with the division plate.

In connection with the face plate and mold box described I contemplate the use of several accessories to provide desired formations. For example if it is desired to simultaneously form two blocks in a single molding operation I make use of division plates 118, preferably centrally offset beyond the respective side surfaces as at 119 to form the rounded depression in the end walls of the article. For the purpose of the division plates I prefer to use a face plate 120 of particular construction in that it is provided at the desired location of the division plate with a transversely disposed rib 121 designed to engage a recess 122 in the lower edges of the division plate. A holding bracket 123, Fig. 12, is arranged to support the division plate from the mold wall 15, said bracket comprising spaced arms 124 between which the edge of the division plate is to be inserted, which arms project from a rear plate 125 in L-form to provide for engaging the upper edge of the wall 15. The bracket is designed to receive a set screw 126 to secure the same in fixed relation to the mold wall. It is, of course, to be understood that the face plate 120 may be formed for the coöperation of desired number of division plates, and that said division plates may be in any sectional form desired.

An auxiliary adjusting means for the end walls is particularly illustrated in Fig. 5. This means comprises a bar or rod 127 to be secured in the head 78 of the operating arm, the relatively inner terminal of the rod having a socket piece 128 provided with a set screw to receive the pin 76 projecting from the end wall. By the use of these rods the end walls may be given an extreme adjustment toward each other to very materially reduce the length of the completed article.

In Figs. 13 and 14 I have illustrated another important accessory of the present apparatus, namely, an adjustable angle former, whereby I am enabled to form one or both ends of the molded article in practically any desired angular arrangement. This former comprises two plates 129 and 130, the latter of which is formed at one end with a base extension 131 designed to rest upon the surface of plate 129 and provided with set screws 132 adapted to pass through longitudinally disposed slots 133 arranged in the plate 129, whereby to permit the bodily longitudinal adjustment of the plate 130 with relation to the plate 129. The plate 129 is provided on the relatively rear surface with bearing posts 134, designed in use to bear against one end of the mold wall and maintain the plate 129 at an angle to the end wall. In the respective adjustments of the plates it is necessary to vary the angular relation of plate 129 with respect to the end wall of the mold sections, and for this purpose I provide the posts 134 with adjustable extensions. I contemplate the use of any desired structure for this purpose, preferring, however, that such means be in the form of a set screw 135 seated in the end of the post, or in the form of a sleeve 136 slidably engaging the end of the post and held in desired adjusted position thereto through the medium of a set screw 137, all as clearly shown in Fig. 13. In the use of the angle former the plate 129 is arranged so that the relatively rear edge thereof engages in the corner of the mold box formed by the juncture of the end wall and the mold wall 15, with the posts 134 bearing against the end wall. The plate 130 is designed to bear at its free edge against the wall 15, and the post extension and the wall 130 may be adjusted to provide a variety of angles between the parts. The angle former is important in an apparatus of this kind, as for example I am enabled to readily detach the plate 130 and substitute for such plain plate a plate having a face of any desired simulation, as for example of rock or the like. The face plate may then be similarly formed on the molding plate, up to the point of juncture with the plate 130. This will produce a block having the desired simulation, while the face plate in rear of the juncture described may be plain so that it may be used to form a plain face block in conjunction with the plain face plate 130. It is also desirable that the inner or operative ends of the levers 102, for controlling the operating arm, be formed to avoid undue friction and binding. For this purpose I provide the operative terminals of said levers with rollers 138 designed to normally bear upon a guide plate 139 secured to the intermediate bar extension 37, the fingers 104 being adapted in operation to engage the rollers. A comparatively frictionless movement is thus provided for, avoiding any binding in operation.

The salient and important feature of the present invention is the production of an apparatus in which the respective mold sections may be conveniently assembled into mold box forming relation, or separated from such relation through the movement of a single lever, the separating operation being at the control of the operator through the manual movement of the lever, while the assembling operation is in effect automatically performed. Another important feature of the present invention is the independent adjustability of the respective mold sections to provide for absolutely truing the mold box or for adjusting the same to form an article of desired size. The pallet clamping means arranged for the accommodation of pallets of different thicknesses is another material feature of the present invention, as it increases the scope of the machine and does not limit it to a pallet of certain prescribed dimensions. Furthermore, the length of the pallet capable of use with the apparatus is limited only by the extent of the recesses in the operating arms, while the width of the pallet is entirely unrestricted.

It is, of course, apparent that in reducing the machine to form an article of less length than normal it is not essential that both of the end walls 16 be adjusted, as the proper adjustment of either of said walls will effect the desired result without the necessity of further change.

While preferring the details of structure herein described and shown it is to be understood that I do not limit myself thereto, and that I consider as within the spirit of the present invention all such changes and variations of the present structure as may fall within the scope of the appended claims.

Having thus described the invention what is claimed as new, is:—

1. A molding apparatus including a mold box comprising a fixed wall, end plates, a face plate, and a pallet, a framework for supporting the fixed wall, a frame movably mounted on the framework and carrying the remaining sections of the mold box, said frame when in operative position disposing the pallet section of the box in parallel relation to the fixed wall, and means carried by the frame to automatically adjust one of said mold sections in the closing movement of the frame.

2. A molding apparatus including a mold box comprising a fixed wall, end plates, a face plate, and a pallet, a framework for supporting the fixed wall, a frame movably mounted on the framework and carrying the remaining sections of the mold box, said frame when in operative position disposing the pallet section of the box in parallel relation to the fixed wall, and means carried by the frame for clamping the pallet in position relative to the remaining sections of the mold box.

3. A molding apparatus including a mold box comprising a fixed wall, end plates, a face plate, and a pallet, a framework for supporting the fixed wall, a frame movably mounted on the framework and carrying the remaining sections of the mold box, said frame when in operative position disposing the pallet section of the box in parallel relation to the fixed wall, and means carried by the frame for clamping the pallet in position relative to the remaining sections of the mold box, said means being arranged to accommodate pallets of different thicknesses.

4. A molding apparatus including a mold box comprising a fixed wall, end plates, a face plate, and a pallet, a framework for supporting the fixed wall, a frame movably mounted on the framework and carrying the remaining sections of the mold box, said frame when in operative position disposing the pallet section of the box in parallel relation to the fixed wall, and means carried by the frame for independently moving the end walls with relation to the face plate.

5. A molding apparatus including a mold box comprising a fixed wall, end plates, a face plate, and a pallet, a framework for supporting the fixed wall, a frame movably mounted on the framework and carrying the remaining sections of the mold box, said frame when in operative position disposing the pallet section of the box in parallel relation to the fixed wall, means carried by the frame for independently moving the end walls with relation to the face plate, and means automatically actuated in the movement of the end wall operating means for releasing the face plate from mold box forming position.

6. A molding apparatus including a fixed frame, a mold frame adjustably mounted on the fixed frame, a mold box including a pallet, rods supported by the mold frame, cams carried by said rods, means for operating the rods, and connections intermediate the cams and pallet, whereby in the operation of the rods the pallet is clamped in place.

7. A molding apparatus including a fixed frame, a mold frame adjustably mounted on the fixed frame, a mold box including a pallet, rods supported by the mold frame, cams carried by said rods, means for operating the rods, and connections intermediate the cams and pallet, said cams being adjustably mounted on the rods to accommodate pallets of different thicknesses.

8. A molding apparatus including a fixed frame, a mold frame adjustably mounted on the fixed frame, a mold box arranged in the mold frame and including a pallet, rods mounted in the mold frame, clamping bars for the pallet movably connected to the mold frame, pins connected to said bars, and cams carried by the rods and formed with slots to receive the pins.

9. A molding apparatus including a mold frame, a mold box including a face plate, brackets depending from the face plate, plates depending from the mold frame, a shaft mounted in said plates, cams arranged on said shaft intermediate the plates and engaging the brackets, and means for automatically operating the shaft in one direction.

10. A molding apparatus including a mold frame, a mold box including a face plate, brackets depending from the face plates, plates depending from the mold frame, a shaft mounted in said plates, cams arranged on said shaft intermediate the plates and engaging the brackets, means for automatically operating the shaft in one direction, and means for manually operating the shaft in the opposite direction.

11. A molding apparatus including a mold frame, a mold box including a face plate, brackets depending from the face plates, plates depending from the mold frame, a shaft mounted in said plates, cams arranged on said shaft intermediate the plates and engaging the brackets, means for automatically operating the shaft in one direction, said plates being formed with cam surfaces, and handles connected to the brackets and bearing on said cam surfaces whereby to manually adjust the face plate at will.

In testimony whereof, I affix my signature in presence of two witnesses.

SAMUEL FRANKLIN NICOLAI.

Witnesses:
   DAVID W. GOULD,
   JOHN L. FLETCHER.